United States Patent
Roshanzamir et al.

(10) Patent No.: US 9,634,345 B2
(45) Date of Patent: Apr. 25, 2017

(54) CONVECTIVE FLOW FIELD FOR FUEL CELL STACK

(71) Applicants: Daimler AG, Stuttgart (DE); Ford Motor Company, Dearborn, MI (US)

(72) Inventors: Alireza Roshanzamir, Burnaby (CA); Robert Henry Artibise, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 0 days.

(21) Appl. No.: 13/901,642

(22) Filed: May 24, 2013

(65) Prior Publication Data

US 2013/0316263 A1 Nov. 28, 2013

Related U.S. Application Data

(60) Provisional application No. 61/652,213, filed on May 27, 2012.

(51) Int. Cl.
| | |
|---|---|
| *H01M 8/02* | (2016.01) |
| *H01M 8/04* | (2016.01) |
| *H01M 8/10* | (2016.01) |
| *H01M 8/026* | (2016.01) |
| H01M 8/0265 | (2016.01) |
| H01M 4/86 | (2006.01) |
| H01M 8/1018 | (2016.01) |

(52) U.S. Cl.
CPC ......... *H01M 8/1002* (2013.01); *H01M 8/026* (2013.01); *H01M 8/0265* (2013.01); *H01M 2004/8689* (2013.01); *H01M 2008/1095* (2013.01)

(58) Field of Classification Search
CPC ............... H01M 8/026; H01M 8/0265; H01M 2004/8689; H01M 2008/1095
USPC .......................................................... 429/457
See application file for complete search history.

(56) References Cited

U.S. PATENT DOCUMENTS

| | | | |
|---|---|---|---|
| 6,586,128 B1 * | 7/2003 | Johnson et al. | 429/444 |
| 6,663,997 B2 * | 12/2003 | Dong et al. | 429/443 |
| 6,960,407 B2 * | 11/2005 | Shibata et al. | 429/480 |
| 7,413,826 B2 * | 8/2008 | Ueda et al. | 429/479 |
| 8,221,932 B2 * | 7/2012 | Takehiro et al. | 429/457 |
| 2004/0101736 A1 * | 5/2004 | Tawfik et al. | 429/37 |
| 2009/0311143 A1 * | 12/2009 | Lee et al. | 422/119 |

FOREIGN PATENT DOCUMENTS

WO WO 2010084745 A1 * 7/2010

* cited by examiner

*Primary Examiner* — Gregg Cantelmo
(74) *Attorney, Agent, or Firm* — Stephan A. Pendorf; Patent Central LLC

(57) ABSTRACT

The reactant distribution in a gas diffusion layer adjacent the landings of a solid polymer electrolyte fuel cell can be improved by using a flow field plate in which suitable sequential protrusions have been incorporated in the channels. The reactant flow field in the plate comprises a plurality of parallel channels in which protrusions are arranged in a sequence along each channel's length and the sequential protrusions in any given channel are offset with respect to the sequential protrusions in the channels immediately adjacent thereto.

15 Claims, 4 Drawing Sheets

CONVECTIVE FLOW FIELD FOR FUEL CELL STACK

BACKGROUND

Field of the Invention

This invention relates to flow field plate constructions for solid polymer electrolyte fuel cells.

Description of the Related Art

Solid polymer electrolyte or proton exchange membrane fuel cells (PEMFCs) electrochemically convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, an anode flow field plate and a cathode flow field plate, each comprising numerous fluid distribution channels for the reactants, are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications. In such a stack, the anode flow field plate of one cell is thus adjacent to the cathode flow field plate of the adjacent cell. For assembly purposes, a set of anode flow field plates is often bonded to a corresponding set of cathode flow field plates prior to assembling the stack. A bonded pair of an anode and cathode flow field plates is known as a bipolar plate assembly. In some constructions, bipolar plates may be made from a single piece of material (e.g. carbon) in which the cathode and anode flow fields are formed on opposite sides of the material. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated on the electrochemically inactive surfaces of the flow field plates of the cells in the stacks (i.e. the coolant flow field is located within a bipolar plate assembly).

To provide both reactants and the coolant to and from the individual cells in the stack, a series of ports are generally provided at opposing ends of the individual cells such that when the cells are stacked together they form manifolds for these fluids. Further required design features then are passageways in the plates to distribute the bulk fluids in these formed manifolds to and from the various channels in the reactant and coolant flow fields in the plates. These passageway regions are referred to as the transition regions. The transition regions can themselves comprise numerous fluid distribution channels, e.g. oxidant and/or fuel transition channels.

While simple seeming enough in principle, achieving a desirable distribution of reactants to the electrodes and a desirable removal of by-products therefrom in high power density fuel cell designs is nonetheless quite complex and many factors have to be considered. For instance, the landings which separate the fluid distribution channels in typical flow field plates provide mechanical support and thus cannot be too thin. However, the distribution of gases to and from those regions in the gas diffusion layers immediately adjacent the landings is not as good as that in those regions immediately adjacent the channels.

Another issue to consider is that the compositions of the supplied reactant gases changes significantly as they travel through a practically sized fuel cell. As reactants get consumed and gaseous and liquid water by-products are created, these gas compositions change substantially and designs have to be incorporated to accommodate the changing nature of these gases.

Much effort has gone into improving the gas distribution to and from the fuel cell electrodes and in understanding the details of flow within such fuel cell stacks. For instance, convective flow in gas diffusion layers and different flow field designs have been discussed in publications such as C. Y. Soong et al., "Analysis of reactant gas transport in a PEM fuel cell with partially blocked fuel flow channels", Journal of Power Sources, 143 (2005) 36-47; and T. Kanezaki et al., "Cross-leakage flow between adjacent flow channels in PEM fuel cells", Journal of Power Sources, 162 (2006) 415-425.

In particular, consideration has been given to designs which include projections or the like in the flow field channels and which provide various benefits. JP2004241141 for instance includes projections inside the gas channels and turbulence occurs in the reaction gas which spreads with an effect that generation of electricity improves. In US 20040151973, flow restrictors are strategically located in the flow field channels to achieve certain desired pressure differentials. Further, JP2004327162 effectively includes restrictions in order to obtain more uniform surface pressure in the cells.

However, while such designs can offer modest benefits for gas distribution or other purposes under certain operating conditions, there is a continuing need for improved reactant gas distribution under other and varied operating conditions. This invention addresses such issues and provides further related advantages.

SUMMARY

It has been found that certain organized arrangements of protrusions in the flow field channels of such fuel cells can provide more control on the cross flow achieved in the regions of the gas diffusion layers adjacent the flow field plate landings. With greater control throughout, the overall reactant concentrations adjacent and under the landings can be increased and the by-products removed more effectively. And as a consequence, the fuel cell performance can be further improved.

The flow field plate for such a solid polymer electrolyte fuel cell comprises a major surface for distribution of a reactant, a reactant port for the inlet of the reactant, a reactant port for the outlet of the reactant, and a reactant flow field formed in the major surface of the plate. The reactant flow field inlet is fluidly connected to the inlet reactant port, and the reactant flow field outlet is fluidly connected to the outlet reactant port. Here, the reactant flow field comprises a parallel channel region comprising a plurality of essentially parallel channels and landings separating the channels. The parallel channel region itself comprises a protrusion region in which the plurality of parallel channels comprises a plurality of arranged protrusions that obstruct flow in the channels.

Specifically, the protrusions in each channel in the protrusion region are arranged in a sequence along the length of each channel, and the sequential protrusions in any given channel in the protrusion region are offset along the channel length with respect to the sequential protrusions in the channels immediately adjacent the any given channel.

The parallel channels in the parallel channel region are parallel curves but in particular are essentially linear. Further, while various sequences can be considered, a periodic sequence may be preferred. And while various offsets may be considered, for symmetry it can be preferred for the periodic protrusions in any given channel in the protrusion region to be offset by essentially half a period with respect to the periodic protrusions in the channels immediately adjacent the any given channel.

Use of the invention is suitable for flow field plate embodiments in which the parallel channel region occupies most of the major surface of the flow field plate (i.e. greater than 50%) and in which the protrusion region occupies most of the parallel channel region (i.e. greater than 50%). And the invention is particularly suitable for use in oxidant flow field plate embodiments where the reactant is oxidant.

In certain embodiments, the protrusion region may be incorporated such that it does not occupy that portion of the reactant flow field adjacent the reactant flow field inlet in which the oxygen concentration is greater than 15% during normal operation, or alternatively in which the relative humidity is less than 100% during normal operation.

Numerous shapes and sizes for the protrusions may be contemplated and need not be constant over the sequence. In other words, a dimension of the protrusions can vary over the sequence, for instance being larger adjacent the reactant flow field outlet than adjacent the reactant flow inlet. In other embodiments, the dimensions of the protrusions can be essentially constant over the sequence.

Modeling has indicated performance benefits can be expected in practical automotive scale solid polymer electrolyte fuel cells that incorporate protrusions in accordance with the invention. In particular, benefits can be expected for embodiments having one or more of the following characteristics: a period of the protrusions arranged in each channel in the protrusion region of about 20 to 30 mm, protrusions occupying between about 0.4 and 0.6 of the depth of the channel, protrusions occupying the width of the channel, protrusions between about 1 to 2 mm in length, and landing widths in the flow field plate greater than 0.3 mm.

The invention provides a method of improving reactant distribution in a solid polymer electrolyte fuel cell and particularly convective flow in gas diffusion layers therein. Better reactant distribution can be achieved with greater control than certain prior art embodiments. These and other aspects of the invention are evident upon reference to the attached Figures and following detailed description.

DETAILED DESCRIPTION

Herein, the following definitions have been used.

"Parallel" describes a curve that is displaced from a base curve by a constant amount and is thus considered equidistant therefrom. Every normal of one such curve is also a normal of the base curve. Herein, a channel is essentially parallel to another channel if the basic and novel characteristics of the channels do not differ materially from those of actual parallel curve shaped channels.

In a quantitative context, the term "about" should be construed as being in the range up to plus 10% and down to minus 10%.

"Normal operation" refers to operating a fuel cell within its nominal ranges of operating conditions (e.g. current density, temperature).

The invention is particularly useful for increasing the reactant concentrations in, and in removing reaction products from, the gas diffusion layers immediately adjacent and under the landing regions in flow field plates of typical solid polymer electrolyte fuel cells.

Figure 1A:
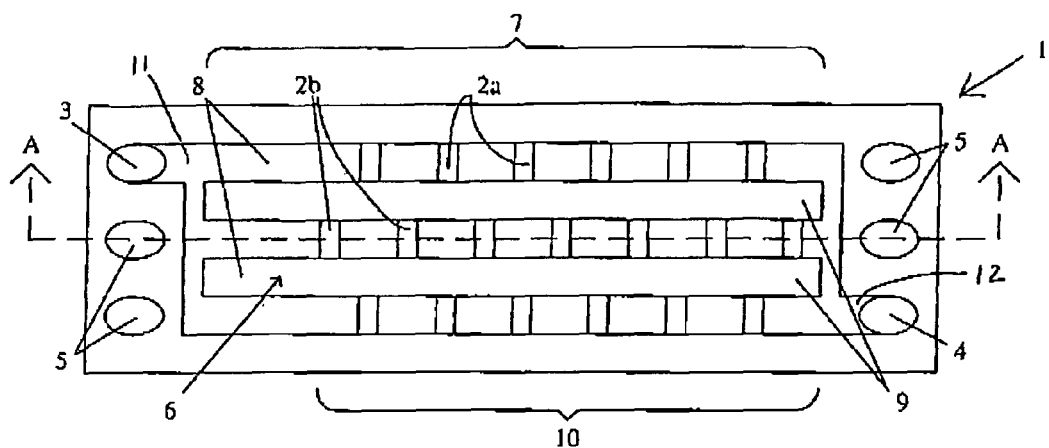
FIG. 1a shows a schematic of a flow field plate for a solid polymer electrolyte fuel cell comprising protrusions in a periodic sequence in the parallel linear flow field channels of the plate.

FIG. 1a shows a schematic of an oxidant flow field plate 1 for a typical solid polymer electrolyte fuel cell for automotive applications. Flow field plate 1 is of conventional design except that it comprises protrusions 2a, 2b in accordance with the invention. As shown in FIG. 1a, flow field plate 1 comprises oxidant inlet port 3, oxidant outlet port 4, and other ports 5 for the inlet and outlet of fuel and coolant. The reactant flow field inlet 11 is fluidly connected to the inlet reactant port, and the reactant flow field outlet 12 is fluidly connected to the outlet reactant port. Oxidant flow field 6 is formed in the depicted surface of plate 1 and comprises a parallel channel region 7 containing a plurality of parallel oxidant channels 8 separated by landings 9. (For clarity in the schematic of FIG. 1a, only three channels 8 and two landings 9 have been shown. In actual embodiments, an order of magnitude or more of channels and landings would likely be present) As shown in FIG. 1a, oxidant flow field 6 is essentially entirely made up of parallel channels and landings and thus flow field 6 is essentially the same as parallel channel region 7 and occupies more than 50% of the surface of plate 1. In other embodiments, flow field 6 may comprise additional regions having different flow field configurations.

Parallel linear flow field channels 8 in plate 1 also comprise protrusions 2a, 2b located in a periodic sequence and extending over protrusion region 10. Where present, the protrusions are of sufficient height to introduce local pressure gradients by restricting gas flow, e.g. protrusion heights are greater than about ¼ the channel depth. As depicted, protrusions 2a, 2b are absent from the region near oxidant inlet port 3 but otherwise appear over the length of channels 8. Thus, protrusion region 10 here extends from the protrusion closest to inlet port 3 to the end of parallel channel region 10 and thus occupies more than 50% of parallel channel region 7.

As shown, protrusions 2a and 2b are arranged in a periodic sequence along the length of channels 8 (i.e. are spaced apart by a constant distance, this distance being the period). And periodic protrusions 2b in their associated channel are offset by essentially half a period with respect to periodic protrusions 2a in the immediately adjacent channels.

Figure 1B:
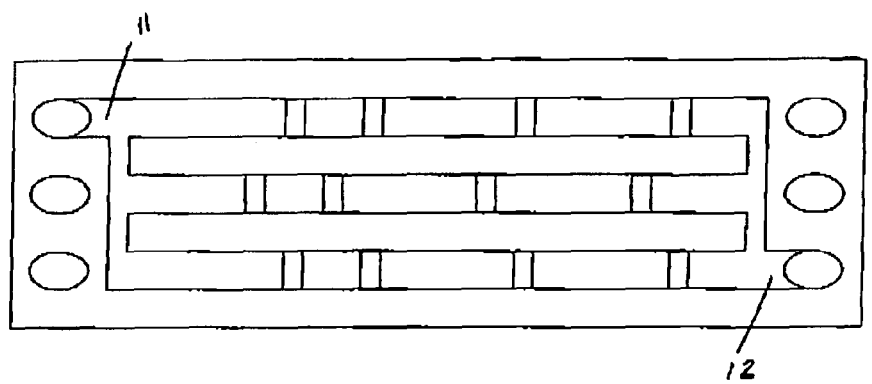
FIG. 1b shows a schematic of a flow field plate similar to that of FIG. 1a except that the protrusions are arranged in a non-periodic sequence.

While the periodic sequence of the embodiment of FIG. 1a provides a desired symmetry to the design of the flow field plate and to the transverse flows of gas in the GDL, the composition of the gases and their velocities change as they traverse the length of the flow field from inlet to outlet as a result of the electrochemical reactions taking place within. In certain case, it may be preferred to employ a protrusion sequence that is regular but not periodic (e.g. where spacings are harmonics of the shortest spacing, or even other alternative sequences). For instance, FIG. 1b shows an alternative schematic embodiment for a flow field plate which is similar to that of FIG. 1a except that the protrusions are arranged in a non-periodic sequence (namely certain protrusions have been omitted nearest to the inlet 3, and thus the spacings are not constant but are harmonics).

The introduction of protrusions 2a, 2b in channels 8 increases convection by introducing repeating local pressure gradients between neighboring channels which result from the restrictions to gas flow created by the periodic protrusions. A relatively small portion of the flow in a channel can be forced through the adjacent GDL, under the landing, to a neighboring channel. The protrusions increase convection in the GDL, and thus increase the concentration of reactant under the landing as well as the pressure drop in the channel. Performance may be enhanced by removing water vapor from the GDL (and potentially liquid water) while delivering higher oxidant concentration to the catalyst layer. However, excessive flow from channel to channel could cause a drying out and/or localized high reactant concentration. Thus, optimization of the protrusion configuration involves a trade-off between convection under the landing, pressure drop in the channel and water management.

Regarding design considerations, the lateral velocity v in the GDL can be estimated from Darcy's law, $$v = \frac{k}{\mu} \frac{\Delta P}{w}$$

where:
k=in-plane permeability
ΔP=pressure gradient between to neighboring channels
μ=fluid viscosity
w=landing width The fluid velocity in the GDL thus depends on the specific design parameters of the flow field and GDL. For a given fluid viscosity, the velocity can increase by increasing the pressure gradient, in-plane permeability, or decreasing landing width. Those skilled in the art will appreciate that while it is simple in principle to increase convection in the GDL with a wide range of protrusion configurations, the size, number, and spacing of protrusions should be selected to provide improved convection under a balance of the conditions of most importance. Numerous parameters must be considered for a given set of conditions. And, as disclosed in the Examples to follow, one configuration of protrusions may be preferred for one set of operating conditions while being relatively poor under a different set of operating conditions. Overall then, a different configuration may be preferred to provide improvement under a balance of operating conditions than under any specific operating condition. While complex, appropriate consideration and the calculations required may be expected from those of ordinary skill in the art. The Examples below provide a useful guide in that regard.

In general, the spacing (or period in FIG. 1a) between protrusions should be sufficiently large to avoid large sidewise pulses without being so large so as to have no transverse effect over much of the channel length. Further, various shapes for the protrusions may be contemplated, but a streamlined design is advantageous to avoid flow separation and wake behind the protrusions. For manufacturing ease, the width of the protrusions may be chosen to be full width of the channel.

More specifically, since the inlet region of the fuel cell is relatively dry, it may be preferred not to incorporate protrusions at all here. Thus, as an example, it may be preferred to omit protrusions in that portion of the reactant flow field near the reactant flow field inlet in which the oxygen concentration is greater than 15% during normal operation, or alternatively in which the relative humidity is less than 100% during normal operation.

However, at the opposite end of the fuel cell, relatively more liquid water is expected near the outlet port than in the bulk of the flow field and higher gas velocities may be expected to be acceptable, even preferred. Thus, the protrusions may be designed to be more of an obstacle near the outlet port and may therefore have bigger dimensions and/or more protrusions may be employed.

Figure 1C:
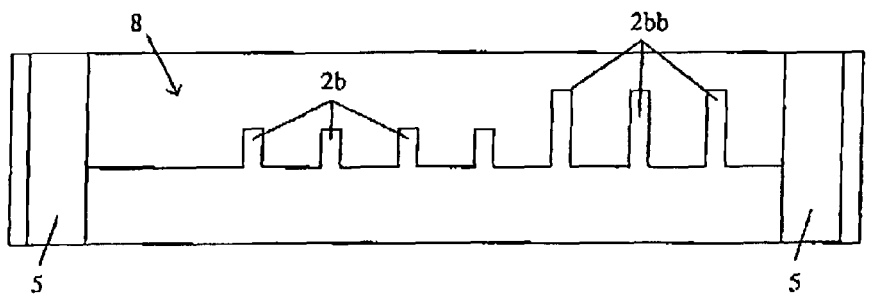
FIG. 1c shows a schematic of a cross-section along a channel of a flow field plate similar to that along section A-A in FIG. 1a except that the height dimension of the protrusions extending from the bottoms of the channels varies over the length of the channels.

The protrusion design for a fuel cell with no protrusions in the inlet region and with more obstructing protrusions in the outlet region is exemplified in the schematic of FIG. 1c. FIG. 1c shows a cross-section along a channel of a flow field plate, similar to that along section A-A in FIG. 1a, except that the height dimension of the protrusions varies over the length of the channels. Specifically, there are no protrusions near the inlet region, and also protrusions 2bb near the outlet are greater in height than protrusions 2b in the middle of channel 8.

Other embodiments than those shown in FIGS. 1a to 1c may of course be contemplated in order to obtain the advantages of the invention.

The following examples are illustrative of the invention but should not be construed as limiting in any way.

EXAMPLES

Figure 2A:
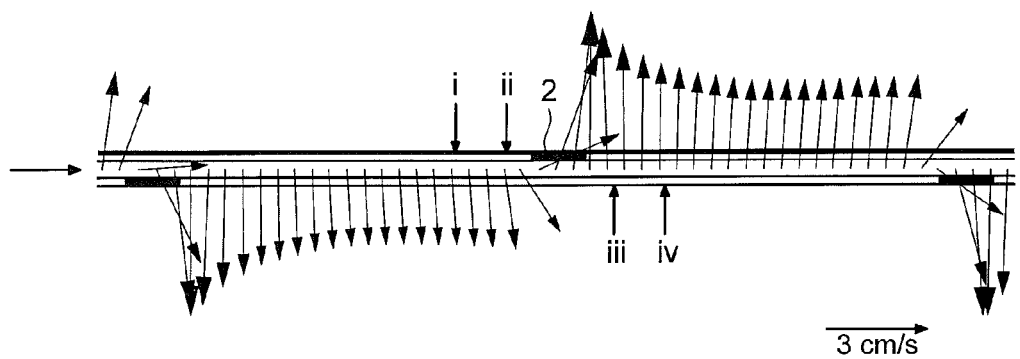
FIG. 2a shows a schematic of the simplified model in the Examples with two half channels and one landing there between and also shows the velocity vectors of reactant in the GDL for an exemplary gas flow in the channels.

The velocity vectors for oxidant flow under the landings in the oxidant gas diffusion layer (GDL) in an exemplary solid polymer electrolyte fuel cell of the invention were calculated based on the simplified model schematically shown in FIG. 2a. The exemplary fuel cell was of a conventional construction and employed an oxidant flow field comprising numerous parallel linear channels. Except here however, the channels also comprised offset periodic sequences of protrusions along their length.

The simplified model included two channels that were the same depth as a conventional channel (0.52 mm deep) but only half the width (i.e. half of 0.49 mm or 0.245 mm wide) with a single landing in between of width 0.5 mm. In each channel, the protrusions were periodically spaced 22.8 mm apart but the protrusions in one channel were offset from the protrusions in the other channel by half a period. The protrusions were 1.5 mm in length, were as wide as the channel, and occupied half the channel depth (i.e. 0.26 mm). From symmetry, the simplified model thus would be expected to be applicable in providing the approximate flow velocities under all the landings in the GDL for the exemplary fuel cell.

FIG. 2a shows a portion of the model over only one period of the protrusions. The model comprises two half channels 21, landing 22, and protrusions 23 in each half channel 21. Representative velocity vectors 25 for the oxidant flow under the landings in the GDL are also shown in FIG. 2a.

In the exemplary embodiment, the GDL thickness was taken to be 0.18 mm and the in-plane permeability of the GDL under the landing was $1.9 \times 10^{-12}$ $m^2$. Inlet air was assumed as the oxidant having a density of 2.4 kg/$m^3$ at 60° C.

Representative velocity vectors for oxidant flow in the GDL under the landing were then calculated for this model when air, represented by arrow 24, is supplied to each half channel from the left in FIG. 2a at a conventional average velocity of 10 m/s. Computational fluid dynamics software (STAR-CCM+) was used to do the calculations. FIG. 2a depicts these calculated representative velocity vectors 25. The magnitude of each velocity vector 25 can be determined by comparing its length to the scale provided in FIG. 2a. The estimated average lateral velocity in the GDL under the landing was determined to be about 3 cm/s. (Note: the model was not corrected for porosity.)

However, in a conventional fuel cell without protrusions in the flow field channels, significant net lateral oxidant flow would only be expected in the GDL under the landings if/when random liquid water droplets formed in the channels. Thus, incorporating protrusions in the channels, in this specific periodic sequence, is expected to result in a marked change in lateral flow in the GDL under the landings.

Representative expected oxygen mole fractions were then calculated in the channels and under the landings in the GDL for the model. And also for comparison, calculations were done for a similar model except without protrusions incorporated in the channels. Contours of the oxygen mole fractions were determined along the flow direction at the four locations indicated at i, ii, iii, and iv in FIG. 2a.

Figure 2B:
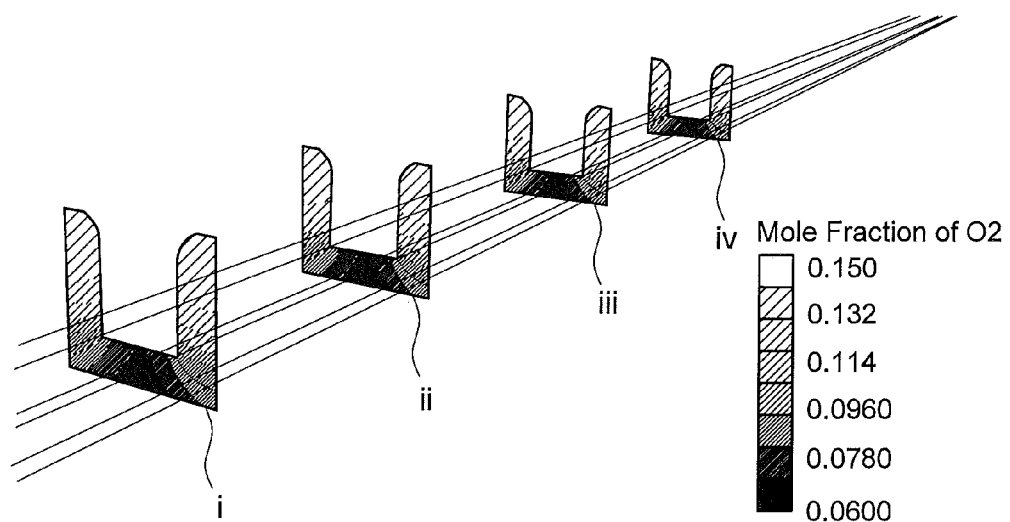
FIG. 2b shows the calculated expected contours of oxygen mole fractions in the channels and under the landing in the GDL at certain locations in the simplified model of FIG. 2a if no protrusions were incorporated in the channels.
Figure 2C:
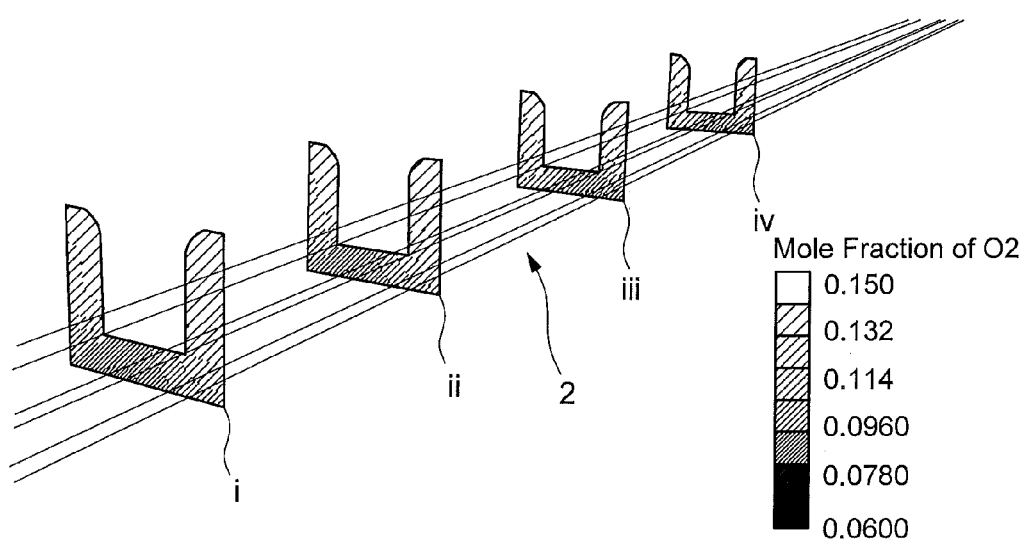
FIG. 2c shows the calculated expected contours of oxygen mole fractions in the channels and under the landing in the GDL at certain locations in the simplified model of FIG. 2a if the protrusions were present in the channels.

FIGS. 2b and 2c show the oxygen mole fraction contours for the model with no protrusions in the channels and the model with protrusions in the channels respectively. The contours are marked according to their location along the channels as shown in FIG. 2a. Note that the model is considered to be oriented such that the GDL appears at the bottom of the figures. Thus, the horizontal component of these contours illustrates the oxygen mole fraction in the GDL while the vertical components of the contours represent the oxygen mole fraction in the two adjacent channels.

The scales shown in FIGS. 2b and 2c give an indication of the gradient in oxygen mole fraction. The darker the shading, the lower the oxygen mole fraction. The model with no protrusions (FIG. 2b) shows that the contours are essentially the same at each location and that the oxygen mole fraction drops to a very low value (0.06) in the GDL adjacent the middle of the landings.

The model with protrusions (FIG. 2c) on the other hand shows a much more uniform oxygen mole fraction throughout. There is much less of a drop in oxygen mole fraction in the GDL than there is in FIG. 2b. In FIG. 2c, a protrusion 2 is located on the right hand side between locations ii and iii. Although perhaps difficult to see, the minimum oxygen mole fractions in the contours at locations i and ii are shifted to the left in the GDL adjacent the landings. On the other hand, the minimum oxygen mole fractions in the contours at locations iii and iv are shifted to the right in the GDL adjacent the landings. This is a result of convection and the periodic nature upstream and downstream of the protrusions in the channels.

Next, a series of tests were conducted on a single fuel cell. The cell's flow field plates comprised a set of 36 parallel linear flow field channels. The overall dimensions of the plate were 185 mm by 90 mm and the active area was slightly larger than that occupied by the channels. The channel dimensions were 114 mm in length, 0.49 mm in width, and 0.52 mm in depth. The landing widths were 0.5 mm. Where protrusions were employed, they were all spaced 22.8 mm apart. The protrusions in each channel were offset from those in adjacent channels by half a period. Each protrusion had a length of 1.5 mm and a width filling that of the channel. The lead in lengths (the distance from the edge of the plate to the first protrusion) were 17.1 and 28.5 mm (i.e. 17.1 plus half a period) for neighboring channels. The protrusion heights varied however between the cells tested. A conventional cell having no protrusions was tested for comparative purposes and two cells having protrusions 0.26 mm high (50% of channel depth) and 0.34 mm high (66% of channel depth) respectively were also tested. Hereafter, these plates will be referred to the comparative, moderate, and aggressive plate designs respectively.

The cells were operated under different operating conditions using fully humidified hydrogen and varied mixtures of oxygen and nitrogen as reactants. To explore the effects of the different protrusion heights under certain varied operating conditions, the cells were operated at varied combinations of temperatures (including 40, 60, and 80° C.), current densities (including 1.5, 2, 2.5 and 3 A/$cm^2$), oxygen concentrations as supplied in the inlet oxidant stream (from 9 to 21% [$O_2$]), and oxidant flow rates (from 10 to 20 slpm flow rate which translates into about 10 m/s and 20 m/s flow rate velocity respectively at the oxidant inlets of the plates).

For instance, at 80° C., the cell employing the moderate plate performed relatively better out of all the tested plates. The aggressive plate performed poorly due to possible excessive drying occurring within the cell.

At 60° C., the cell employing the aggressive plate outperformed both other plates only at lower oxygen concentrations (e.g. less than 15% [$O_2$]) and the difference was less significant at lower current densities.

Further, at 2.5 A/$cm^2$ and 40° C., the aggressive plate substantially outperformed both other plates at all oxygen concentrations tested. At 1.5 A/$cm^2$ however, the cell voltages obtained using each plate were roughly similar at oxygen concentrations of 15% and up. Below this, again the aggressive plate performed best.

Figure 3:
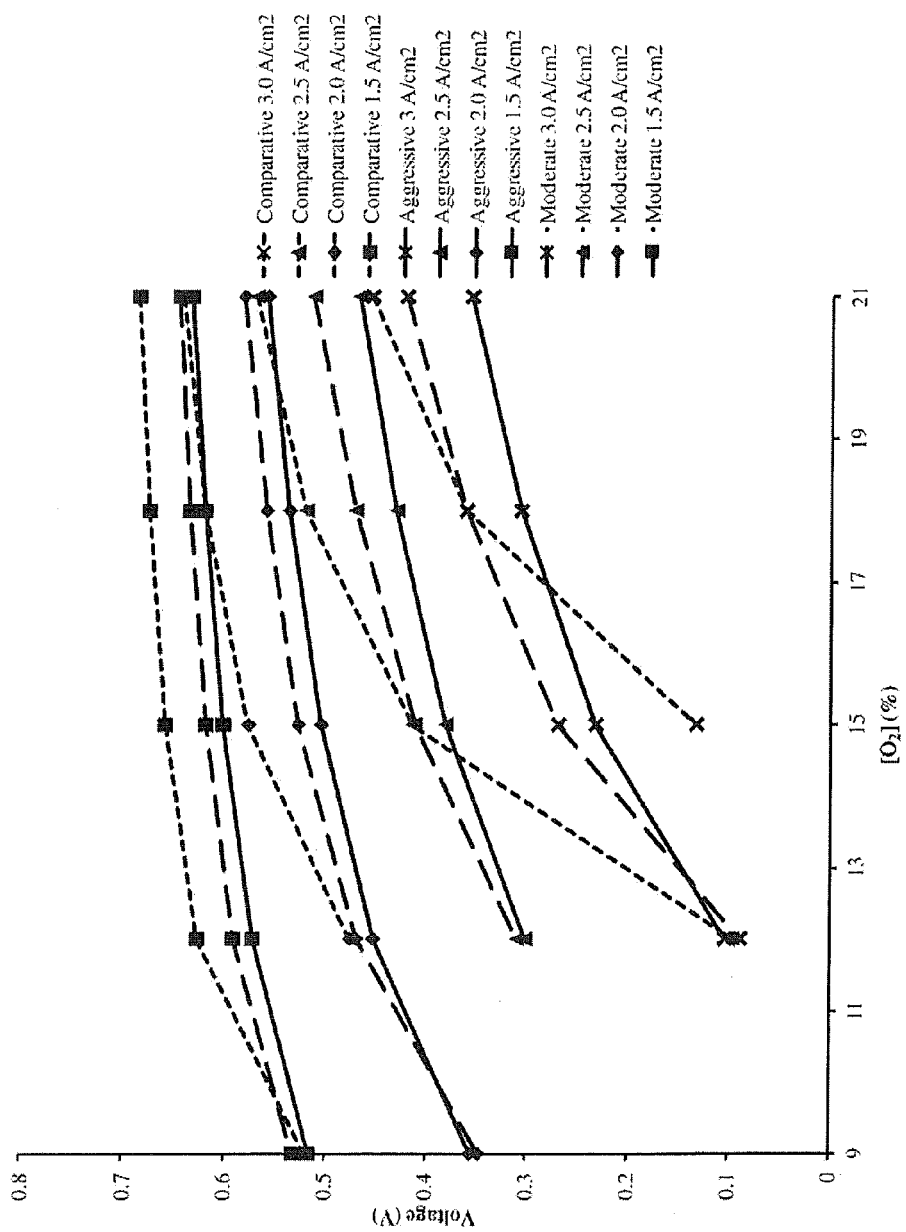
FIG. 3 shows plots of cell voltage versus inlet oxygen concentration at several current densities for two fuel cell embodiments having different size protrusions and compares to plots for a comparative fuel cell with no protrusions.

FIG. 3 shows the set of plots obtained at 80° C. for the three embodiments tested at several different current densities and 20 slpm oxidant flow rate. (In FIG. 3, data for the comparative, moderate, and aggressive designs are shown by short dashed, long dashed, and solid lines respectively. Data for 1.5, 2.0, 2.5, and 3.0 A/$cm^2$ are shown by squares, diamonds, triangles, and crosses respectively.) It is noteworthy however that a preferred operating envelope can be at current densities of 2.5 A/cm² or greater and at oxygen concentrations between about 12 and 15%. In this envelope, both the moderate and aggressive cell designs outperformed the comparative design (by about 200 mV at 2.5 A/cm² and 12% [O₂]) with the moderate design being slightly preferred.

With regards to the effect of varied gas velocities, it was observed for instance that cell performance might not be altered much at 80° C. Decreasing the inlet flow rate to 10 slpm in the moderate plate (and hence the gas velocity in the channels from 20 m/s to 10 m/s) did not result in a significant performance difference.

The results obtained from the three plates varied depending on the combinations of parameters tested. In some cases, no significant differences were found. In other cases, a plate of the invention performed substantially better than the comparative plate. Thus, selection of a preferred design requires an investigation evaluating performance, pressure drop, and water management over the operating conditions of interest.

Those skilled in the art will appreciate therefore that properly incorporating protrusions according to the invention can be a complex process. While significant effects can be obtained, various factors must be considered and all the possible required operating conditions for a given embodiment must also be considered, and performance trade-offs likely will be required under certain of these conditions.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A flow field plate for a fuel cell comprising:
a major surface for distribution of a reactant;
an inlet reactant port for the inlet of the reactant;
an outlet reactant port for the outlet of the reactant; and
a reactant flow field formed in the major surface of the plate, the reactant flow field including a reactant flow field inlet fluidly connected to the inlet reactant port, the reactant flow field including a reactant flow outlet fluidly connected to the outlet reactant port, the reactant flow field comprising a parallel channel region comprising a plurality of essentially parallel channels and landings separating the channels, and the parallel channel region comprising at least one protrusion region wherein each channel of the plurality of parallel channels respectively comprises a sequence of protrusions, each protrusion partially obstructing flow in the channels;
wherein the protrusions in each channel are arranged in a regular sequence along the length of each channel, wherein the regular sequence is
a recurring periodic sequence or
a regular but not periodic sequence wherein spacings are harmonics of the shortest spacing;
wherein the reactant flow field is an oxidant flow field, wherein said oxidant includes oxygen;
wherein, in a protrusion region near the outlet port, protrusions having bigger dimensions or more protrusions are provided, and
wherein the protrusions in each channel in the protrusion region are offset along the channel length with respect to the protrusions in each immediately adjacent channel.

2. The flow field plate of claim 1 wherein the parallel channels in the parallel channel region are essentially linear.

3. The flow field plate of claim 1 wherein the protrusions in each channel are arranged in a recurring periodic sequence, and wherein the protrusions in any given channel in the protrusion region are offset by essentially half a period with respect to the periodic protrusions in the channels immediately adjacent the any given channel.

4. The flow field plate of claim 1 wherein the parallel channel region occupies greater than 50% of the major surface of the flow field plate.

5. The flow field plate of claim 4 wherein the protrusion region occupies greater than 50% of the parallel channel region.

6. The flow field plate of claim 1 wherein the protrusions in each channel are arranged in a recurring periodic sequence, and wherein the period of the protrusions arranged in each channel in the protrusion region is about 20 mm to 30 mm.

7. The flow field plate of claim 1 wherein the protrusions occupy between about 0.4 and 0.6 of the depth of the channel.

8. The flow field plate of claim 1 wherein the protrusions occupy the width of the channel.

9. The flow field plate of claim 1 wherein the width of the landings is greater than 0.3 mm.

10. A method of improving reactant distribution in a solid polymer electrolyte fuel cell, the fuel cell comprising a solid polymer electrolyte, a catalyst electrode adjacent the solid polymer electrolyte, a gas diffusion layer adjacent the catalyst electrode, and a flow field plate adjacent the gas diffusion layer, the method comprising:
incorporating the flow field plate of claim 1 for the flow field plate adjacent the gas diffusion layer.

11. The method of claim 10 comprising arranging the protrusions in each channel in a recurring periodic sequence and offsetting the protrusions in any given channel in the protrusion region by essentially half a period with respect to the periodic protrusions in the channels immediately adjacent the any given channel.

12. The method of claim 10 comprising:
determining, in a flow field plate prior to provision of protrusions, the portion of the oxidant flow field in which the oxygen concentration is greater than 15% during normal operation, and
arranging protrusions in the flow field plate to form the flow field plate of claim 10, wherein the protrusion region does not occupy that portion of the reactant flow field adjacent the oxidant flow field inlet wherein the oxygen concentration is greater than 15% during normal operation in the flow field plate prior to provision of protrusions.

13. A flow field plate for a fuel cell comprising:
a major surface for distribution of a reactant;
an inlet reactant port for the inlet of the reactant;
an outlet reactant port for the outlet of the reactant; and
a reactant flow field formed in the major surface of the plate, the reactant flow field including a reactant flow field inlet fluidly connected to the inlet reactant port, the reactant flow field including a reactant flow outlet fluidly connected to the outlet reactant port, the reactant flow field comprising a parallel channel region comprising a plurality of essentially parallel channels and landings separating the channels, and the parallel channel region comprising at least one protrusion region wherein each channel of the plurality of parallel channels respectively comprises a plurality of protrusions, each protrusion partially obstructing flow in the channels;

wherein the protrusions in each channel are arranged in a regular sequence along the length of each channel, wherein the regular sequence is a recurring periodic sequence or a regular but not periodic sequence wherein spacings are harmonics of the shortest spacing;

wherein the reactant flow field is an oxidant flow field, wherein said oxidant includes oxygen;

wherein the protrusions in each channel in the protrusion region are offset along the channel length with respect to the protrusions in each immediately adjacent channel; and wherein the height of the protrusions varies over the sequence and the protrusions near the outlet of each said channel are greater in height than protrusions in the middle of channel.

14. A flow field plate for a fuel cell comprising:
a major surface for distribution of a reactant;
an inlet reactant port for the inlet of the reactant;
an outlet reactant port for the outlet of the reactant; and
a reactant flow field formed in the major surface of the plate, the reactant flow field including a reactant flow field inlet fluidly connected to the inlet reactant port, the reactant flow field including a reactant flow outlet fluidly connected to the outlet reactant port, the reactant flow field comprising a parallel channel region comprising a plurality of essentially parallel channels and landings separating the channels, and the parallel channel region comprising at least one protrusion region wherein each channel of the plurality of parallel channels respectively comprises a plurality of protrusions, each protrusion partially obstructing flow in the channels;

wherein the protrusions in each channel are arranged in a regular sequence along the length of each channel, wherein the regular sequence is a recurring periodic sequence or a regular but not periodic sequence wherein spacings are harmonics of the shortest spacing;

wherein the reactant flow field is an oxidant flow field, wherein said oxidant includes oxygen;

wherein, in a protrusion region near the outlet port, protrusions having bigger dimensions or more protrusions are provided;

wherein the protrusions in each channel in the protrusion region are offset along the channel length with respect to the protrusions in each immediately adjacent channel; and wherein the protrusions are between about 1 mm to 2 mm in length.

15. A solid polymer electrolyte fuel cell comprising
a solid polymer electrolyte,
a catalyst electrode adjacent the solid polymer electrolyte,
a gas diffusion layer adjacent the catalyst electrode, and
a flow field plate adjacent the gas diffusion layer, wherein the flow field plate comprises:
a major surface for distribution of a reactant;
an inlet reactant port for the inlet of the reactant;
an outlet reactant port for the outlet of the reactant; and
a reactant flow field formed in the major surface of the plate, the reactant flow field including a reactant flow field inlet fluidly connected to the inlet reactant port, the reactant flow field including a reactant flow outlet fluidly connected to the outlet reactant port, the reactant flow field comprising a parallel channel region comprising a plurality of essentially parallel channels and landings separating the channels, and the parallel channel region comprising at least one protrusion region wherein each channel of the plurality of parallel channels respectively comprises a sequence of protrusions, each protrusion partially obstructing flow in the channels;

wherein the protrusions in each channel are arranged in a regular sequence along the length of each channel, wherein the regular sequence is a recurring periodic sequence or a regular but not periodic sequence wherein spacings are harmonics of the shortest spacing;

wherein the protrusions in each channel have the same width and length, wherein the reactant flow field is an oxidant flow field, wherein said oxidant includes oxygen;

wherein, in a protrusion region near the outlet port, protrusions having bigger dimensions or more protrusions are provided, and wherein the protrusions in each channel in the protrusion region are offset along the channel length with respect to the protrusions in each immediately adjacent channel.

* * * * *